United States Patent [19]

Kugler

[11] Patent Number: 4,882,960
[45] Date of Patent: Nov. 28, 1989

[54] LAWN MOWER BLADE LOCK

[76] Inventor: Jack L. Kugler, 746 NE. 43rd St., Topeka, Kans. 66617

[21] Appl. No.: 279,993

[22] Filed: Dec. 5, 1988

[51] Int. Cl.$^4$ .......................... B23Q 3/00; B23P 19/04
[52] U.S. Cl. ......................................... 81/488; 29/240; 29/283; 76/82.1; 269/319
[58] Field of Search ................ 76/82.1; 29/240, 281.1, 29/281.4, 281.6, 283, 267; 269/319; 81/488

[56] References Cited

U.S. PATENT DOCUMENTS

| | | |
|---|---|---|
| 1,076,919 | 10/1913 | Speck . |
| 1,855,537 | 4/1932 | Zachary . |
| 2,736,088 | 2/1956 | Thygeson . |
| 2,976,602 | 3/1961 | Nelson . |
| 3,122,354 | 2/1964 | Rodeback . |
| 3,326,159 | 7/1974 | Otto . |
| 3,678,561 | 7/1972 | Mautz, Sr. . |
| 4,297,921 | 11/1981 | Wydra . |
| 4,315,339 | 2/1982 | Lightner . |
| 4,392,264 | 7/1983 | Booe, Jr. . |
| 4,457,033 | 7/1984 | Lightner . |
| 4,564,991 | 1/1986 | Taylor . |

Primary Examiner—Roscoe V. Parker
Attorney, Agent, or Firm—Hovey, Williams, Timmons & Collins

[57] ABSTRACT

A lawn mower blade lock is provided which is especially useful for servicing a lawn mower by enabling both lifting one side of a lawn mower to expose the blade and simultaneously securing the blade of the mower against rotation during efforts to remove the blade. The lock includes a handle and a pair of blade constraining barriers which extend beneath the mower deck and resist rotation, combined with a locking mechanism which attaches to the mower deck. The locking mechanism preferably includes a threaded shank which clamps the mower deck between the barriers and an abutment on the shank for resisting rotation of the blade relative to the deck. In this manner, the lock is easy to attach and remove, and thus is also useful during storage of the mower to prevent inadvertent starting of the lawn mower by children. Moreover, the lawn mower blade lock is economical to construct and easy to attach.

15 Claims, 1 Drawing Sheet

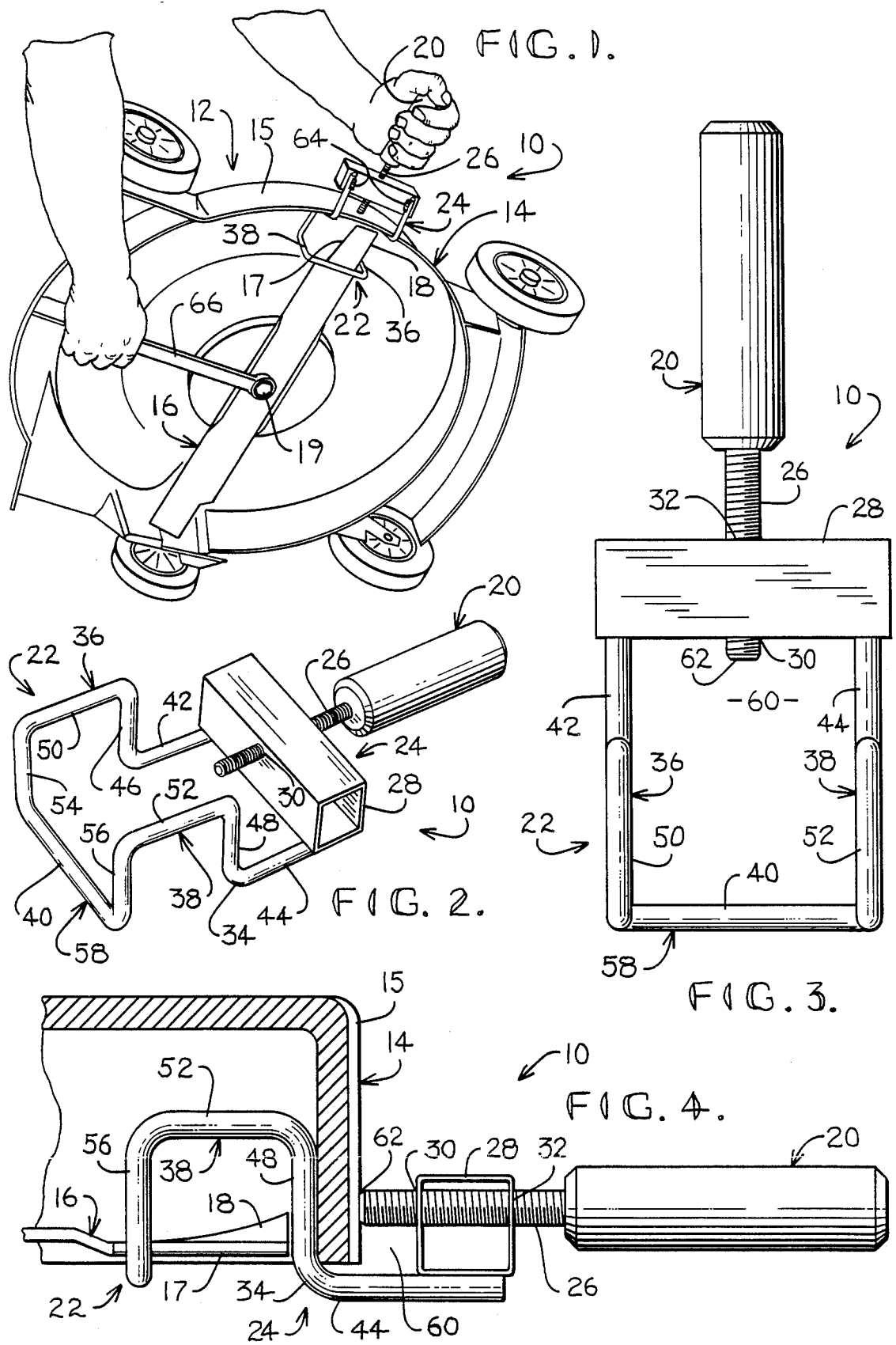

LAWN MOWER BLADE LOCK

BACKGROUND OF THE INVENTION

1. Field of the Invention

This invention relates to a hand tool especially suited for use in facilitating the servicing of lawn mowers and, more particularly, to a lawn mower blade lock uniquely adapted to both lock a lawn mower blade relative to a mower deck and to lift one side of the mower off the ground once secured to the deck. The lock hereof is of simple, yet highly effective construction which is both economical to manufacture and convenient to use. The invention hereof is concerned with a lock having a handle for both removably securing the lock relative to the mower deck and for lifting one side of the mower off the ground, and spaced barriers adapted to receive a conventional rotary lawn mower blade therebetween.

2. Description of the Prior Art

One of the annual rites of spring is the removal of a homeowner's conventional walk-behind powered rotary mower from storage and preparing it for the grass-cutting season. This process typically involves removal and sharpening of the rotary lawn mower blade. Unfortunately, the blade is mounted on the shaft of the lawn mower engine on the underside of the mower. This necessitates lifting one side of the mower off the ground to gain access to the blade.

The blade is conventionally mounted beneath a circular lawn mower deck and is usually tightly secured against rotation by a bolt to which considerable torque must be applied to remove it. This typically results in the user grappling with the mower in an effort to hold the mower tilted upright, retain the blade in place and apply torque to the securing bolt by a wrench or the like. Because when the mower is raised to a position to gain access to the blade it is often resting on two wheels, the mower is inherently unstable and has a tendency to tip to one side or the other during the removal process. All of this results in an extremely frustrating and difficult process simply because of the necessity of attempting to balance the mower while preventing the blade from rotating.

Furthermore, small children may be fascinated with a power mower which they have seen their parents operate. Such mowers are often provided with "easy-to-start" or power starting features In such circumstances, the child may gain access to the mower and cause it to start, whereby the blade will rotate presenting a dangerous situation for an unwary or inquisitive child.

The necessity of fixing the blade during removal has been previously recognized. For example, in U.S. Pat. No. 4,564,991 to Taylor, a tool has been provided for attachment to a lawn mower blade which permits the user to gain greater leverage during removal of an overly tightened or rusted nut. In U.S. Pat. No. 3,826,159 to Otto, a lawn mower blade sharpener is disclosed which is adapted for grasping a lawn mower blade during sharpening. Finally, in U.S. Pat. No. 2,976,602, an abraiding tool handle is shown in use on a lawn mower deck which has been chocked against the mower deck as shown in FIG. 2.

While these devices serve to attach and hold the blade, they do not adequately address the problem of holding the mower deck while constraining the rotary blade. Further, they do not enable the user to lift the mower deck into position by simply attaching the lock to the mower deck, but require the mower deck to be already tilted into position prior to attachment to the blade. Finally, these prior blade holding devices do not provide an easy and convenient means of locking a blade in position when the mower is unattended.

SUMMARY OF THE INVENTION

The problems outlined above are in large measure solved by the lawn mower blade lock in accordance with the present invention. The lawn mower blade lock hereof is compact, easy to construct and use, and enables the user to use one hand to both hold the mower deck and constrain the blade against rotation.

The lawn mower blade lock in accordance with the present invention broadly includes a handle, a blade constraining barrier, and a locking mechanism interconnecting the two whereby the lawn mower blade may be constrained within the barrier while the lock is attached to the deck. The lock hereof may be easily attached by simply slipping the same under the deck of a lawn mower and then capturing the lawn mower blade between the inwardly extending barriers.

In preferred forms, the lawn mower blade lock includes a handle connected to a threaded shank which is adapted for engagement with the exterior of a lawn mower deck. The shank is threaded within a brace, from which extends a pair of blade constraining barriers. Preferably these barriers are formed into an integral, sinuous rod which is adapted to loop beneath the mower blade and form a deck accommodating channel with the shank and brace.

The rod is configured to extend to two barrier sections spaced sufficiently far apart to accommodate the width of a mower blade therebetween, and lie in parallel but separate planes to the threaded shank and handle. These barriers serve to prevent the blade from rotating during removal of the fastening bolt or resist turning of the blade when the lock is clamped to the mower deck.

BRIEF DESCRIPTION OF THE DRAWING

FIG. 1 is a perspective view of the lawn mower blade lock in accordance with the present invention attached to the deck of a lawn mower during removal of a blade-securing bolt;

FIG. 2 is an enlarged, perspective view of the lawn mower blade lock hereof, showing the handle and a deck accommodating channel between the shank and the barriers;

FIG. 3 is an enlarged, top plan view of the lawn mower lock hereof; and

FIG. 4 is an enlarged, fragmentary side elevational view o the lawn mower blade lock hereof shown attached to a lawn mower deck and constraining a lawn mower blade between the barriers thereof, with a portion of the deck cut away to view the blade and a barrier.

DESCRIPTION OF THE PREFERRED EMBODIMENT

Referring now to the drawing, a lawn mower blade lock 10 in accordance with the invention is adapted for use with a conventional, rotary lawn mower 12 having a deck 14 with an exterior sidewall 15 in surrounding relationship to rotary mower blade 16. Blade 16 includes sharpened leading edge 17 and trailing edge 18 which respectively lead and trail during rotation of the blade 16 on the shaft. The blade 16 is conventionally held in place on a drive shaft (not shown) by a securing bolt 19, the shaft being connected to an engine or electric motor for rotating the shaft.

Turning particularly to FIG. 2, the lawn mower blade lock 10 hereof broadly includes a handle 20, a blade constraining end 22 and a locking section 24 adapted for securing the lock 10 to a lawn mower deck 14. The cylindrical handle 20 is wooden and easily graspable by a human hand and is mounted coaxially with a threaded metal shank 26 fixed to handle 20. Shank 26 is threadably engaged with brace 28, which is in the form of a metal tube provided with a pair of axially aligned apertures 30, 32 which are threaded for receiving shank 26 therethrough.

Blade-constraining end 22 is in the form of a continuous, rigid, sinuously shaped metal rod 34 bent to form a series of sections thereof. The blade-constraining end 22 includes a pair of transversely spaced, identically shaped barriers 36 and 38 joined at a point remote from brace 28 by a cross member 40. The barriers 36, 38 include outwardly projecting lower stretches 42, 44 extending from the bottom of brace 28, innermost upstanding legs 46 and 48 leading from stretches 42, 44, normally horizontal, outwardly extending upper reaches 50, 52 leading from legs 46, 48 and outermost, normally downwardly extending blockers 54 and 56 leading from reaches 50, 52. Blockers 54 and 56 together with cross member 40, which interconnects the lower ends of blockers 54, 56, form a generally U-shaped loop 58, whose function will be explained hereinafter.

Similarly, when viewed from the side as in FIG. 4, blockers 54 and 56, together with their respective legs 46, 48 and reaches 50, 52 form inverted U-shaped barriers 36 and 38 respectively, and the area between legs 46, 48 on the one hand and brace 28 on the other hand forms a transversely extending channel 60 for receiving the annular sidewall 15 of mower deck 14. Shaft 26 ends in an abutment 62 opposite handle 20, for clamping deck sidewall 15 within channel 60 between the abutment 62 and legs 46, 48. Stretches 42 and 44 are secured to brace 28 by welds 64.

In use, the lawn mower blade lock 10 is inserted beneath the deck 14 of a lawn mower 12, with barriers 36 and 38, and cross member 40 inserted on the interior of the mower deck, while handle 20, shank 26 and brace 28 are on the outside or exterior of the mower deck. Preferably, the orientation of blade 16 will have been determined prior to inserting the lock beneath the mower so that cross member 40 loops beneath the blade 16 and barrier members 36 and 38 are located adjacent leading edge 17 and trailing edge 18 respectively, as shown in FIG. 1.

In this manner, the lock 10 will be oriented with handle 20 and shaft 26 substantially in alignment with the longitudinal axis of the blade 16. Turning to FIG. 4, it may be seen that the lock 10 is inserted so that sidewall 15 of mower deck 14 lies between abutment 62 and legs 46, 48 of the lock. In this position, the blade 16 is laterally confined between the two barriers 36, 38. The lock is securely attached to the deck 14 by rotating handle 20 in a clockwise manner, advancing shank 26 until abutment 62 contacts the exterior surface of mower deck 14 and legs 46, 48 engage the inner surface of mower deck 14. Once the abutment 62 is tightened against deck 14, the mower may be lifted by handle 20, with deck 14 supported by channel 60 and blade 16 supported by loop 58, as shown in FIG. 1. In this manner, the user may grasp handle 20 and thereby both hold mower 12 in position to expose bolt 19 and prevent blade 16 from rotating during the application of a wrench 66 of the like to loosen bolt 19. When a user loosens or tightens bolt 19 by applying torque to wrench 66, the blade 16 is prevented from rotating by the engagement of leading edge 17 or trailing edge 18 with one of barriers 36, 38.

It may be appreciated that lock 10 thereby eliminates the need for any additional vises, clamps or supports to hold the mower in position. Finally, to prevent inadvertent or unintentional starting of the mower, the blade lock 10 hereof may be left secured to the sidewall 15 of mower deck 14, thereby preventing rotation of blade 16 until the lock 10 is removed. While I have described the preferred embodiment of my invention herein, it will be readily apparent that minor changes of structure may be made without departing from the spirit of the invention.

I claim:

1. A lawn mower blade lock for securing a blade against rotation relative to a deck of a rotary lawn mower, comprising:
   a handle;
   a blade-constraining barrier coupled with the handle; and
   means for securing the barrier and the handle to the deck as a unit with the blade constrained by the barrier whereby to fix both the blade and the lock against rotation relative to the deck.

2. A lawn mower blade lock as set forth in claim 1 wherein said barrier includes two blocking members spaced sufficiently to accommodate said blade therebetween.

3. A lawn mower blade lock as set forth in claim 2 wherein said blade is in longitudinal alignment with the handle when the blade is positioned between the blocking members.

4. A lawn mower blade lock as set forth in claim 1 wherein the handle is exterior to said deck when the lock is secured to the mower.

5. A lawn mower blade lock as set forth in claim 1 wherein said barrier includes a pair of spaced blocking members lying in substantially parallel but separate planes to the handle.

6. A lawn mower blade lock as set forth in claim 5 wherein said blocking members are interconnected to present a U-shaped member.

7. A lawn mower blade lock as set forth in claim 1 wherein said locking means includes structure defining a deck-accommodating channel.

8. A lawn mower blade lock as set forth in claim 1 wherein said locking means includes releasable deck abutment means.

9. A lawn mower blade lock as set forth in claim 8 where said abutment means includes a shank threadably mounted on a brace, said shank being coupled to said handle.

10. A lawn mower blade lock as set forth in claim 9 wherein said locking means includes a pair of legs oriented substantially normal to said shank and defining a deck-accommodating channel between the legs and said shank, said legs being integrally formed with said barrier.

11. A lawn mower blade lock for securing a blade having opposite leading and trailing edges thereon against rotation relative to a deck of a lawn mower, comprising:
    a pair of spaced barrier members extending in first and second substantially parallel planes and adapted to be disposed in a blade-confining position along said opposite leading edges of the blade; and means for releasably securing said members to the deck in said position for preventing rotation of the blade relative to the deck.

12. A lawn mower blade lock as set forth in claim 11 wherein said securing means is oriented for engaging a sidewall of said lawn mower deck.

13. A lawn mower blade lock as set forth in claim 12 wherein said securing means includes abutment means for engaging the exterior of said side wall.

14. A lawn mower blade lock as set forth in claim 13 wherein said abutment means is substantially parallel to said barrier means.

15. A lawn mower blade lock as set forth in claim 11 including a handle connected to said barrier members and extending exteriorly to said deck.

* * * * *